United States Patent
Kwon

(10) Patent No.: US 7,995,363 B2
(45) Date of Patent: Aug. 9, 2011

(54) DC-DC CONVERTER

(75) Inventor: Hyeok-Chul Kwon, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 231 days.

(21) Appl. No.: 12/274,651

(22) Filed: Nov. 20, 2008

(65) Prior Publication Data

US 2009/0140703 A1    Jun. 4, 2009

(30) Foreign Application Priority Data

Nov. 30, 2007 (KR) ........................ 10-2007-0123629

(51) Int. Cl.
*H02M 3/18* (2006.01)
*H02M 7/00* (2006.01)

(52) U.S. Cl. ........................................... 363/59; 363/60
(58) Field of Classification Search .............. 363/59–61; 327/536
See application file for complete search history.

(56) References Cited

U.S. PATENT DOCUMENTS

| 6,765,371 B2 | 7/2004 | Kataoka |
| 7,116,156 B2 | 10/2006 | Myono et al. |
| 2003/0042880 A1 | 3/2003 | Kataoka |
| 2004/0246044 A1 | 12/2004 | Myono et al. |
| 2006/0139074 A1 | 6/2006 | Doi |
| 2008/0157733 A1* | 7/2008 | Williams ................. 323/266 |

FOREIGN PATENT DOCUMENTS

| JP | 2003070238 | 3/2003 |
| JP | 2004-336985 | 11/2004 |
| JP | 2006-187056 | 7/2006 |
| KR | 1020030019133 A | 3/2003 |
| KR | 1020040089535 A | 10/2004 |
| KR | 1020060024289 A | 3/2006 |

* cited by examiner

*Primary Examiner* — Adolf Berhane
*Assistant Examiner* — Jue Zhang
(74) *Attorney, Agent, or Firm* — Volentine & Whitt, PLLC

(57) ABSTRACT

A DC-DC converter includes a charge pump unit and a clock pulse generator unit. The charge pump unit precharges a boost node in response to a precharge clock pulse and boosts the boost node to a boosted voltage in response to a pump clock pulse. The clock pulse generator unit generates the precharge clock pulse and the pump clock pulse in which corresponding pulse widths increase during multiple time intervals over time.

12 Claims, 8 Drawing Sheets

DC-DC CONVERTER

PRIORITY CLAIM

A claim of priority is made to Korean Patent Application No. 10-2007-0123629, filed Nov. 30, 2007, in the Korean Intellectual Property Office, the subject matter of which is hereby incorporated by reference.

SUMMARY

The present invention relates to a DC-DC converter, and more particularly, to a DC-DC converter having a clock pulse generator that generates varying clock pulse widths.

With the rapid development of micromachining technology, power supply voltages have been decreased to reduce power consumption. In order to meet demand for high-speed systems capable of high-speed digital communication, high-quality/high-speed display and high-capacity storage, analog and digital blocks within a system use multiple power supply voltages.

Since some electronic devices, or circuits within electronic devices, require various voltages, or high and low voltages, depending on corresponding operation characteristics, charge pump circuits may be used to generate voltages higher than the power supply voltage within the electronic device, or DC-DC converters may be used to generate target DC voltages by reducing or boosting DC voltages.

According to an aspect of the present invention, there is provided a DC-DC converter that includes a charge pump unit and a clock pulse generator unit. The charge pump unit precharges a boost node in response to a precharge clock pulse and boosts the boost node to a boosted voltage in response to a pump clock pulse. The clock pulse generator unit generates the precharge clock pulse and the pump clock pulse in which corresponding pulse widths increase during multiple time intervals over time.

The charge pump unit may include a switch and a charge pump. The switch connects nodes in response to the precharge clock pulse and controls a charge pumping operation after precharging the nodes to first and second voltages, respectively. The charge pump outputs the boosted voltage, by performing the charge pumping operation for the nodes precharged under control of the switch, in response to the pump clock pulse.

The switch may include multiple first and second switches. The first switches precharge first and second nodes to the first voltage by connecting the first and second nodes, and precharge a third node to the second voltage, in response to the precharge clock pulse. The second switches connect the first and third nodes, and connect the second node to a fourth node, in response to the pump clock pulse in the charge pumping operation.

The charge pump may include first and second pump capacitors. The first pump capacitor, connected between the first node and the third node, performs the charge pumping operation for the first and second nodes precharged to the first voltage, in response to the pump clock pulse. The second pump capacitor, connected between the fourth node and the second voltage, outputs the boosted voltage by receiving a pumped voltage of the second node through the fourth node precharged to the second voltage when the second switches are turned on.

The DC-DC converter may further include a pulse-width controller that outputs multiple pulse-width control signals for shortening turn-on times of the precharge clock pulse and the pump clock pulse at an initial operation time, and lengthening the turn-on times by the pulse widths for corresponding durations of the time intervals, after storing the pulse widths and corresponding durations according to the time intervals. The clock pulse generator unit may include multiple pulse generators that generate and selectively output precharge clock pulses and pump clock pulses having pulse widths increasing according to the time intervals, in response to the pulse-width control signals, based on a clock signal.

The pulse-width controller may include a pulse-width control register, a time control register and a counter. The pulse-width control register pre-stores the pulse widths of clock pulses according to the time intervals and outputs the pulse-width control signals for controlling the pulse widths stored according to the time intervals when an operation is started. The time control register pre-stores the clock pulses according to the time intervals and outputs count control signals for controlling the durations of the time intervals stored for the clock pulses when the operation is started. The counter outputs count finish signals by counting the clock pulses in the time intervals in response to the count control signals.

The clock pulse generator may further include an oscillator and a multiplexer. The oscillator generates the clock signal having a regular cycle and a regular duty ratio. The multiplexer receives the precharge clock pulses and the pump clock pulses from the pulse generators, and selects and outputs one precharge clock pulse and one pump clock pulse in response to each of the count finish signals.

The multiple pulse generators include first, second and third pulse generators. The first pulse generator receives the clock signal and generates the precharge clock pulse and the pump clock pulse, respectively having short turn-on times, in a first time interval in response to one of the pulse-width control signals. The second pulse generator receives the clock signal and generates the precharge clock pulse and the pump clock pulse, respectively having turn-on times longer by predetermined amounts than the turn-on times of the first time interval, in a second time interval in response to another one of the pulse-width control signals, the second time interval starting after a first time has elapsed during the first time interval. The third pulse generator receives the clock signal and generates the precharge clock pulse and the pump clock pulse, respectively having turn-on times longer by predetermined amounts than the turn-on times of the second time interval, in a third time interval in response to another one of the pulse-width control signals, the third time interval starting after a second time has elapsed during the second time interval.

The second pulse generator may include multiple pulse generators that control the turn-on times of the precharge clock pulse and the pump clock pulse in multiple second time intervals.

The multiplexer may select and output the precharge clock pulse and the pump clock pulse generated by the first pulse generator in the first time interval. The multiplexer may select and output the precharge clock pulse and the pump clock pulse generated by the second pulse generator in response to one of the count finish signals in the second time interval. Also, the multiplexer may select and output the precharge clock pulse and the pump clock pulse generated by the third pulse generator in response to another one of the count finish signals in the third time interval.

The precharge clock pulse may include a high-level duration shorter than a low-level duration. The pump clock pulse may include a high-level duration longer than a low-level duration.

The precharge clock pulse may perform a turn-on operation in the high-level duration and a turn-off operation in the low-level duration, and the pump clock pulse may perform a turn-off operation in the high-level duration and a turn-on operation in the low-level duration.

The first node may be a power supply voltage node, the second node may be the boost node, the third node may be a ground voltage node, and the fourth node may be an output voltage node. Also, the first voltage may be a power supply voltage and the second voltage may be a ground voltage.

The first time interval may be s a minimum turn-on time interval from the initial operation time to the first time. The second time interval may be a turn-on time control interval from the first time to the second time. The third time interval may be a maximum turn-on time interval after the second time. Also, the second time interval may include multiple second time intervals, during which the turn-on times of the precharge clock pulse and the pump clock pulse are controlled.

Accordingly, the DC-DC converter of the present invention reduces a peak current by distributing an inrush current, which is generated when an operation is started, to time intervals. A power supply overload and malfunction of an electronic device due to breakdown or noise, for example, may thus be prevented.

BRIEF DESCRIPTION OF THE DRAWINGS

The embodiments of the present invention will be described with reference to the attached drawings, in which.

DETAILED DESCRIPTION OF THE EMBODIMENTS

Figure 1:
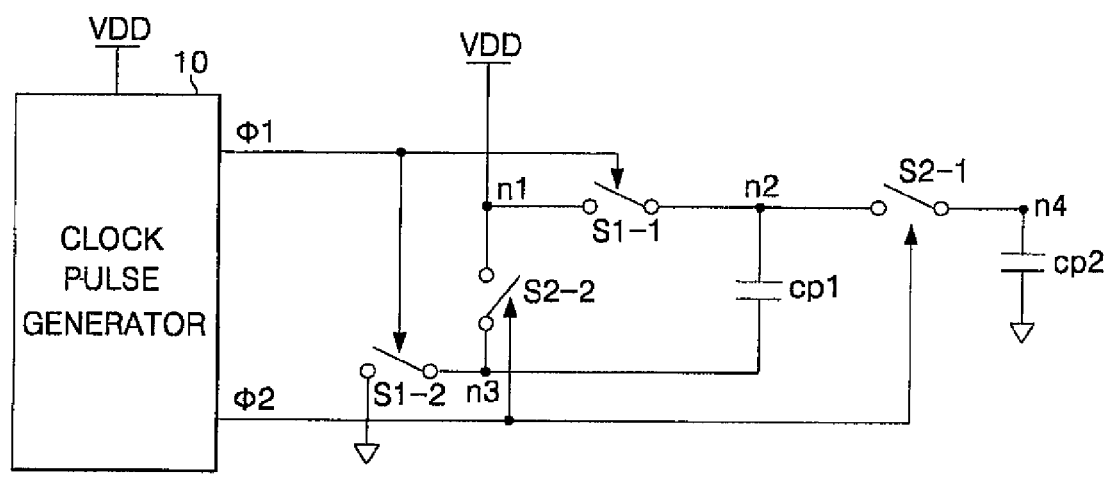
FIG. 1 is a circuit diagram of a conventional switched-capacitor DC-DC converter.

The present invention will now be described more fully with reference to the accompanying drawings, in which exemplary embodiments of the invention are shown. The invention, however, may be embodied in various different forms, and should not be construed as being limited only to the illustrated embodiments. Rather, these embodiments are provided as examples, to convey the concept of the invention to one skilled in the art. Accordingly, known processes, elements, and techniques are not described with respect to some of the embodiments of the present invention. Throughout the drawings and written description, like reference numerals will be used to refer to like or similar elements.

FIG. 1 is a circuit diagram of a conventional switched-capacitor DC-DC converter. The switched-capacitor DC-DC converter includes a clock pulse generator 10, first and second switches S1-1, S1-2 and S2-1, S2-2, and first and second pump capacitors cp1 and cp2.

Figure 2:
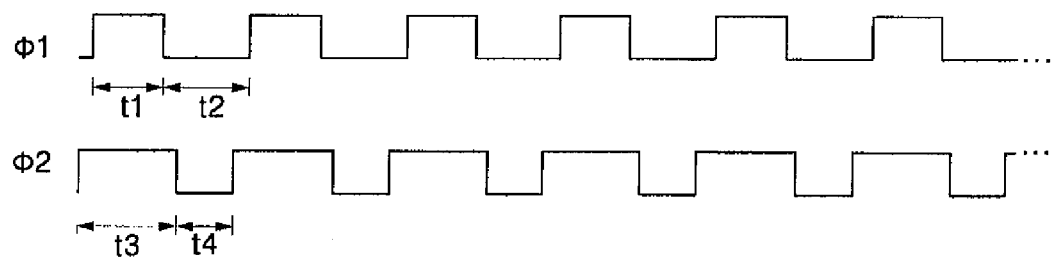
FIG. 2 is a waveform diagram showing clock pulses generated by a clock pulse generator in the conventional switched-capacitor DC-DC converter.

FIG. 2 is a waveform diagram showing clock pulses $\Phi 1$ and $\Phi 2$ generated by the clock pulse generator 10 in the conventional switched-capacitor DC-DC converter. The waveform $\Phi 1$ indicates a precharge clock pulse, in which a high-level interval is shorter than a low-level interval, and the waveform $\Phi 2$ indicates a pump clock pulse, in which a high-level interval is longer than a low-level interval. The precharge clock pulse toggles between a turn-on operation at the high-level interval t1, when the pulse is at a power supply voltage VDD, and a turn-off operation at the low-level interval t2, when the pulse is at a ground voltage VSS. The pump clock pulse toggles between a turn-off operation at the high-level interval t3, when the pulse is at the power supply voltage VDD, and a turn-on operation at the low-level interval t4, when the pulse is at the ground voltage VSS. The high-level interval t1 of the precharge clock pulse is shorter than the high-level interval t3 of the pump clock pulse, and the low-level interval t2 of the precharge clock pulse is longer than the low-level interval t4 of the pump clock pulse.

When the clock pulse generator 10 receives a clock signal and the power supply voltage VDD, it outputs the precharge clock pulse $\Phi 1$ and the pump clock pulse $\Phi 2$ at the power supply voltage VDD, the pulses having different duty ratios. In response to the high-level of precharge clock pulse $\Phi 1$, the first switches S1-1 and S1-2 are turned on. Then, nodes n1 and n2 are connected and precharged to the power supply voltage VDD, and node n3 is precharged to the ground voltage.

When the pump clock pulse $\Phi 2$ transitions to the low level, the second switch S2-2 is turned on in response, and node n3 connects to the power supply voltage VDD. According to the law of conservation of electric charge, a charge pumping operation is performed by the capacitor cp1, and node n2 is pumped to voltage 2 VDD. When the second switch S2-1 is turned on, nodes n2 and n4 are connected, and the pumped voltage 2 VDD is transferred from node n2 to node n4, thereby generating a high voltage VPP corresponding to the maximum voltage 2 VDD from a high-voltage generation terminal.

Figure 3A:
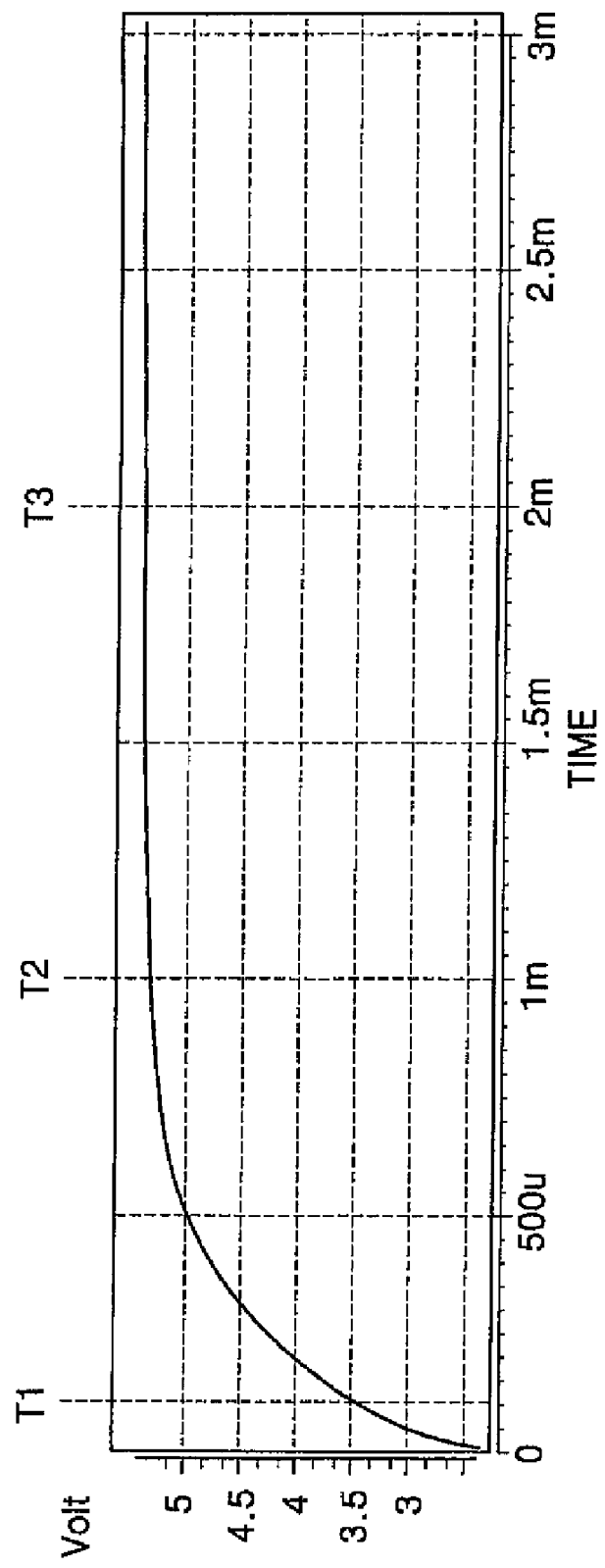
FIGS. 3A and 3B are graphs of simulation results showing time-variant output voltage and output current in the conventional switched-capacitor DC-DC converter.
Figure 3B:
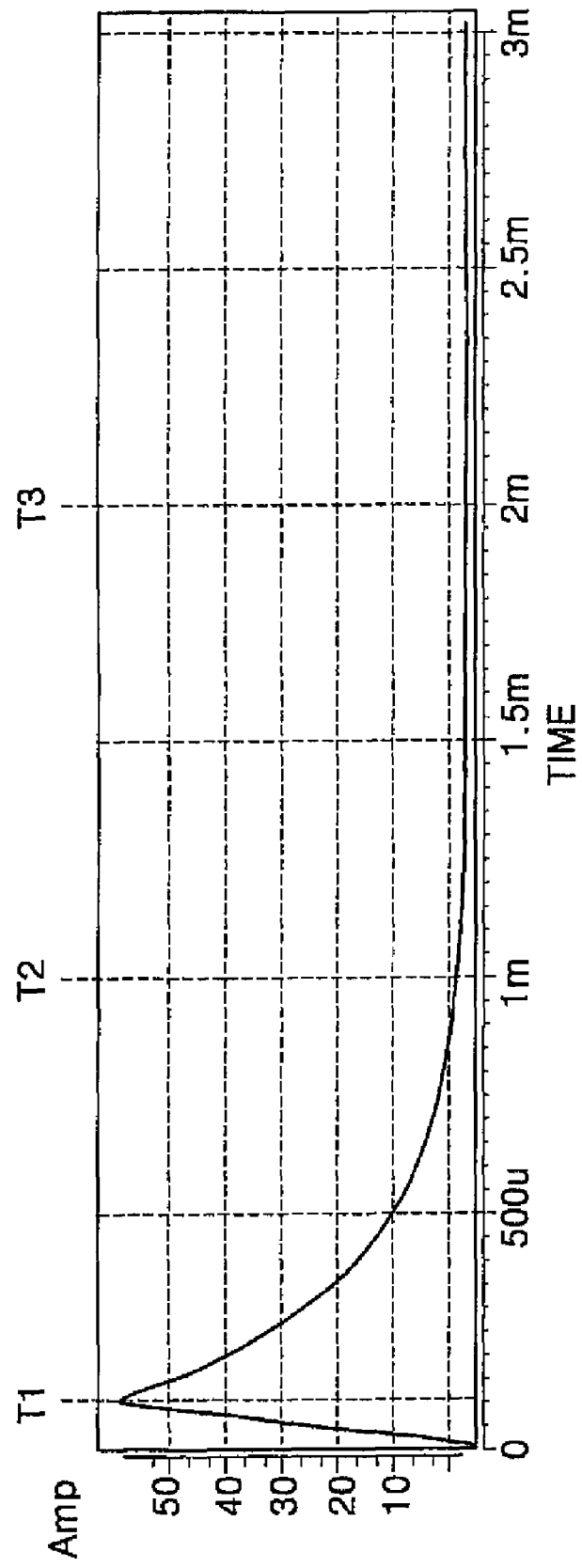

FIGS. 3A and 3B are graphs of simulation results showing time-variant output voltage and time-variant output current in the conventional switched-capacitor DC-DC converter, respectively. In each graph, the horizontal axis represents elapsed time and the vertical axis represents output voltage or current variation, as indicated.

In FIG. 3A, the output voltage increases over time and levels off in a saturation state beginning time T2. In FIG. 3B, the output current exponentially decreases with respect to time after the output current rapidly increases to 50 mA or more at time T1. The output current is in a ground state from time T3, after which no current flows.

In other words, the first and second pump capacitors cp1 and cp2 are each in a state in which no electric charge is stored at the initial operation time of the DC-DC converter. When the first and second switches S1-1, S1-2 and S2-1, S2-2 are turned on, the first and second pump capacitors cp1 and cp2 are pumped to the voltage 2 VDD and a peak current i(t) is rapidly generated for a short time, according to the relationship i(t) =C×d(2 VDD)/dt, which may be referred to as inrush current.

That is, when the operation of the DC-DC converter is started, a required amount of electric charge is not stored in each pump capacitor. Since the required amount of electric charge is stored in each pump capacitor after a predetermined time during which the clock pulse generator 10 operates, by supplying input power to a charge transfer device of the DC-DC converter, a large inrush current from the input power flows for a short time, during which a normal operating state is reached after starting the DC-DC converter operation.

A stabilization power supply is used for the input power of the DC-DC converter. Since the stabilization power supply also provides power to other circuits of a system, the stabilization power supply may be unstable due to excessive inrush current and the other circuits will not operate normally. Since current supply is stopped when a protection circuit of the stabilization power supply operates, the other circuits may not operate. When an overload is caused in the stabilization power supply, breakdown of the electronic device or excessive noise occurs, resulting in malfunction of the electronic device.

Figure 4:
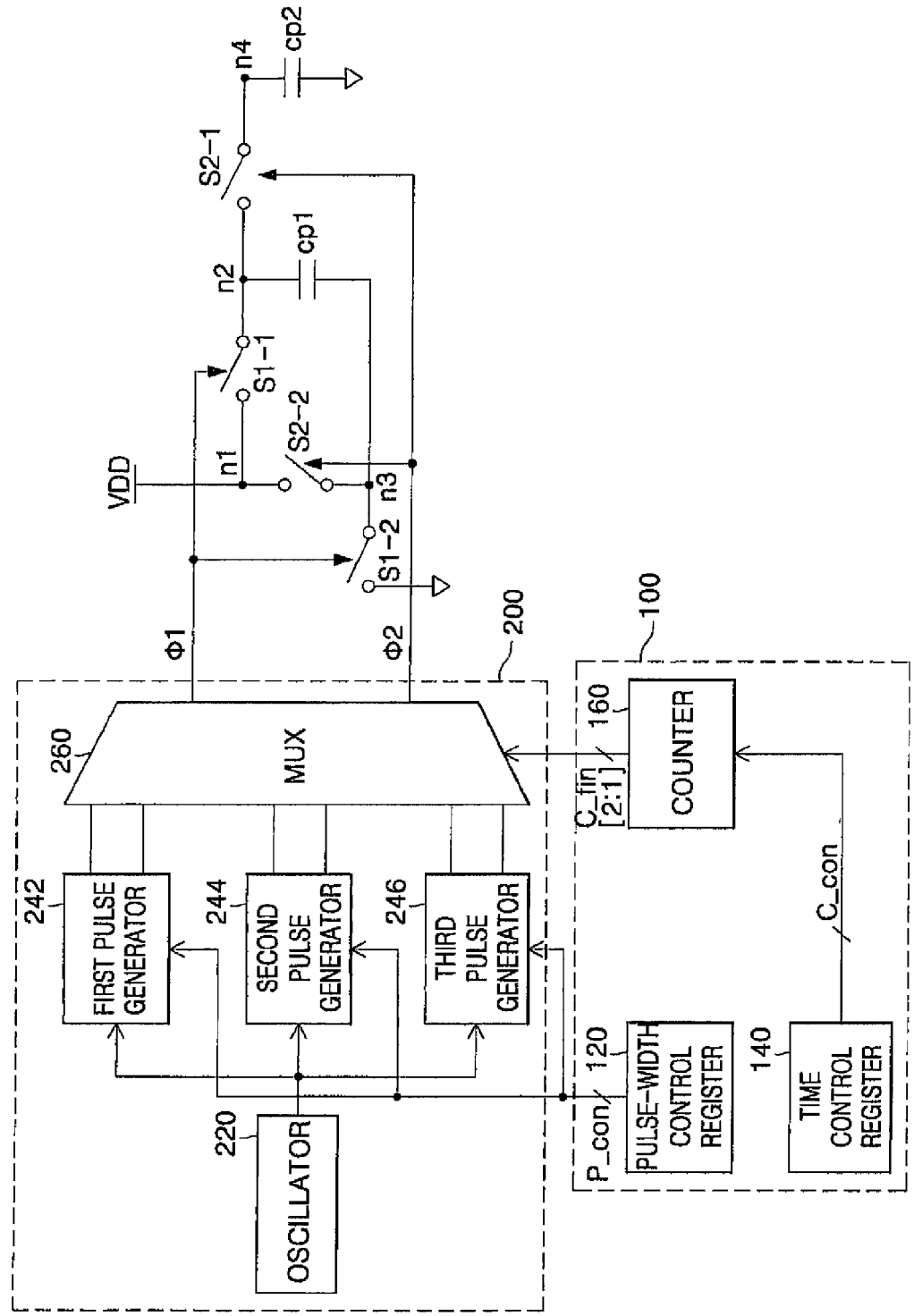
FIG. 4 is a circuit diagram of a switched-capacitor DC-DC converter, according to an exemplary embodiment of the present invention.

FIG. 4 is a circuit diagram of a switched-capacitor DC-DC converter, according to an exemplary embodiment of the present invention. The switched-capacitor DC-DC converter includes a pulse-width controller 100, a clock pulse generator unit 200, first and second switches S1-1, S1-2 and S2-1, S2-2, and first and second pump capacitors cp1 and cp2. The pulse-width controller 100 includes a pulse-width control register 120, a time control register 140, and a counter 160. The clock pulse generator unit 200 includes an oscillator 220, first to third pulse generators 242, 244 and 246, and a multiplexer (MUX) 260.

Pulse widths and corresponding durations, which differ according to time intervals, are stored. The pulse-width controller 100 controls an amount of electric charge flowing into the pump capacitors by outputting multiple pulse-width control signals for shortening turn-on times of clock pulses at an initial operation time, and lengthening the turn-on times of the clock pulses by increasing the pulse widths for the corresponding durations in the time intervals with respect to lapse of time.

After a clock is generated, e.g., by the oscillator 220, the clock pulse generator unit 200 selectively outputs a precharge clock pulse and a pump clock pulse, having pulse widths and durations that differ according to corresponding time intervals, in response to the multiple pulse-width control signals from the pulse-width controller 100. The first and second switches S1-1, S1-2 and S2-1, S2-2 connect or disconnect nodes in response to the precharge clock pulse and the pump clock pulse output from the clock pulse generator unit 200.

The first pump capacitor cp1 performs a charge pumping operation, e.g., according to the law of conservation of electric charge, when the first switches S1-1 and S1-2 are turned on in response to precharge clock pulse $\Phi1$ and the second switch S2-1 is turned on in response to pump clock pulse $\Phi2$, with respect to nodes precharged to power supply level VDD. The second pump capacitor cp2 outputs high voltage VPP through a high-voltage generation terminal when the second switch S2-1 is turned on, connecting nodes n2 and n4, transferring a pumped voltage 2 VDD from the node n2 to the node n4, and charging the transferred pumped voltage 2 VDD.

Figure 5:
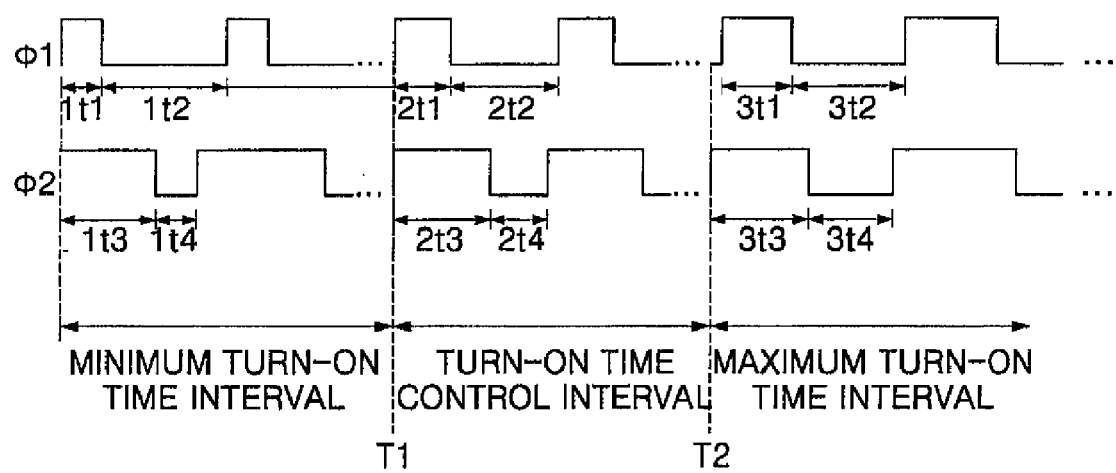
FIG. 5 is a waveform diagram showing clock pulses generated by a clock pulse generator unit in the switched-capacitor DC-DC converter, according to an exemplary embodiment of the present invention.

FIG. 5 is a waveform diagram showing clock pulses $\Phi1$ and $\Phi2$ generated by the clock pulse generator unit 200 in the switched-capacitor DC-DC converter, according to an exemplary embodiment of the present invention. The waveform $\Phi1$ indicates a precharge clock pulse in which the high-level duration is shorter than the low-level duration. The waveform $\Phi2$ indicates a pump clock pulse in which the high-level duration is longer than the low-level duration.

In contrast to the waveforms of conventional clock pulses $\Phi1$ and $\Phi2$ shown in FIG. 2, soft start control is performed to achieve a target ON duty time by shortening an ON duty time at the initial operation time and gradually lengthening the ON duty time as time lapses, in order to prevent an inrush current from being rapidly output when the operation of the DC-DC converter is started.

That is, during a minimum turn-on time interval beginning at the initial operation time, the turn-on times of the precharge clock pulse $\Phi1$ and the pump clock pulse $\Phi2$ are shortened. When first time T1 has elapsed, the turn-on times of the precharge clock pulse $\Phi1$ and the pump clock pulse $\Phi2$ during a turn-on time control interval are respectively a predetermined time longer than those of the minimum turn-on time interval. When second time T2 has elapsed, the turn-on times of the precharge clock pulse $\Phi1$ and the pump clock pulse $\Phi2$ during a maximum turn-on time interval are respectively a predetermined time longer than those of the turn-on time control interval.

In various embodiments, the turn-on time control interval can control the turn-on times of the precharge clock pulse and the pump clock pulse during multiple time intervals. However, for better understanding, one time interval will be described, below, as an example.

Referring to FIG. 5, the precharge clock pulse toggles to perform a turn-on operation in a first high-level interval $1t1$ and a turn-off operation in a first low-level interval $1t2$ during the minimum turn-on time interval, a turn-on operation in a second high-level interval $2t1$ and a turn-off operation in a second low-level interval $2t2$ during the turn-on time control interval, and a turn-on operation in a third high-level interval $3t1$ and a turn-off operation in a third low-level interval $3t2$ during the maximum turn-on time interval.

The pump clock pulse toggles to perform a turn-off operation in a first high-level interval $1t3$ and a turn-on operation in a first low-level interval $1t4$ during the minimum turn-on time interval, a turn-off operation in a second high-level interval $2t3$ and a turn-on operation in a second low-level interval $2t4$ during the turn-on time control interval, and a turn-on operation in a third high-level interval $3t3$ and a turn-off operation in a third low-level interval $3t4$ during the maximum turn-on time interval.

Here, the high-level intervals $1t1$, $2t1$ and $3t1$ of the precharge clock pulse of each time interval are shorter than the high-level intervals $1t3$, $2t3$ and $3t3$ of the pump clock pulse, and the low-level intervals $1t2$, $2t2$ and $3t2$ of the precharge clock pulse are longer than the low-level intervals $1t4$, $2t4$ and $3t4$ of the pump clock pulse.

Figure 6A:
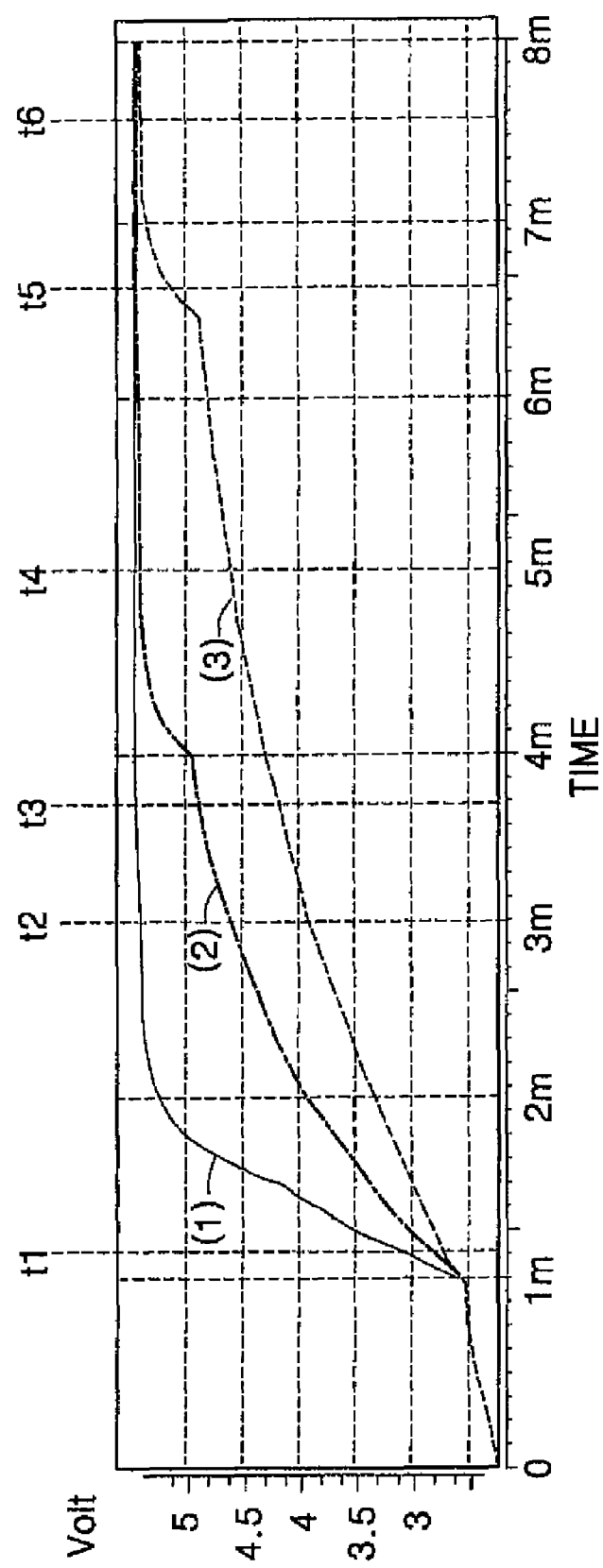
FIGS. 6A and 6B are graphs of simulation results showing time-variant output voltage and output current in the switched-capacitor DC-DC converter, according to an exemplary embodiment of the present invention.
Figure 6B:
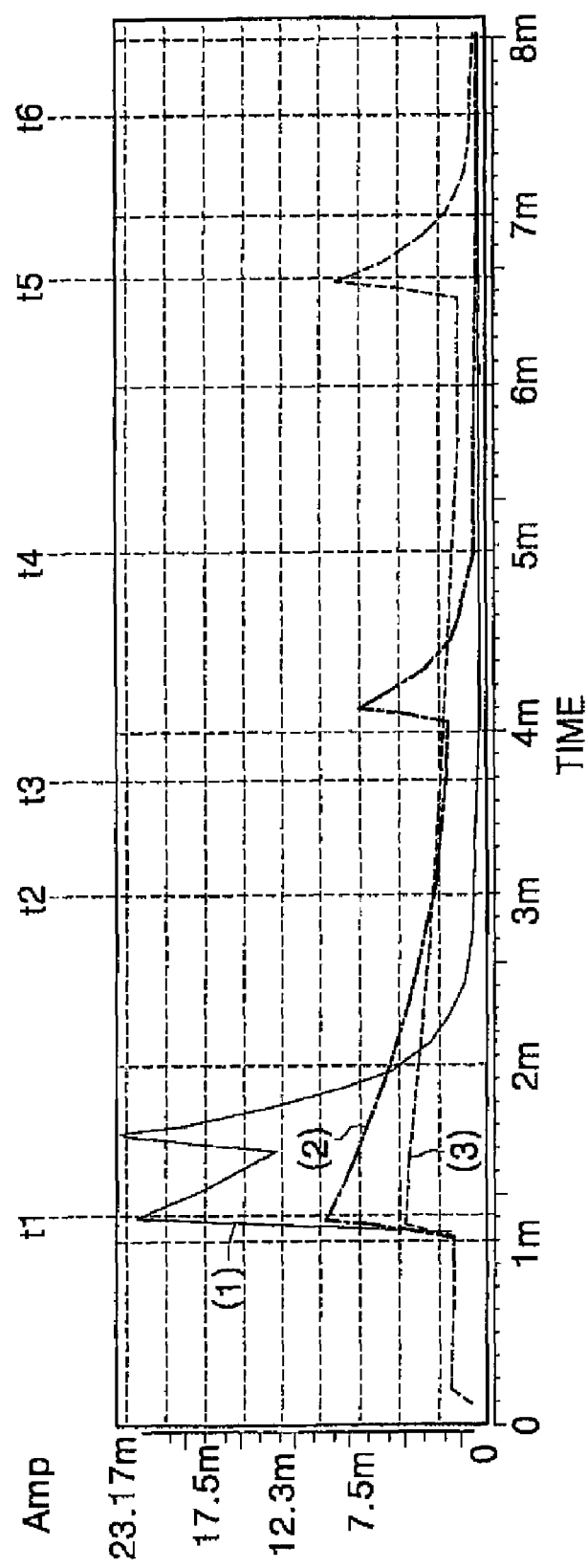

FIGS. 6A and 6B are graphs of simulation results showing a time-variant output voltage and a time-variant output current in the switched-capacitor DC-DC converter, according to an exemplary embodiment of the present invention. In each graph, the horizontal axis represents elapsed time and the vertical axis represents output voltage or current variation, as indicated.

In FIG. 6A, curves (1) to (3) indicate output voltage variations in the minimum turn-on time interval, the turn-on time control interval, and the maximum turn-on time interval, respectively. In FIG. 6B, curves (1) to (3) indicate output current variations in the minimum turn-on time interval, the turn-on time control interval, and the maximum turn-on time interval, respectively. The output voltage or current variations are sequentially shown with respect to time lapse, but all the turn-on times of the clock pulses were set to the same time to compare the curves in the time intervals.

As shown in FIGS. 6A and 6B, the switched-capacitor DC-DC converter of the present invention reduces peak current and prevents inrush current from being rapidly output when operation is started by controlling switch ON times of the time intervals. This is done by controlling an amount of current flowing into the pump capacitors, dividing a rising time of the pumped voltage into multiple slopes, and distributing an increase in the inrush current to the time intervals.

More particularly, in the voltage curve (1) of FIG. 6A, corresponding to the minimum turn-on time interval, the output voltage increases with respect to time proportionately to a steep slope at time t1, and levels off in a saturation state from time t2. In the corresponding current curve (1) of FIG. 6B, the output current exponentially decreases with respect to time after a peak current of 23.08 mA is rapidly generated for a short time at time t1. The output current then stays in a ground state from time t3, and gradually decreases so that no current flows.

In the voltage curve (2) of FIG. 6A, corresponding to the turn-on time control interval, the output voltage increases with respect to time proportionately to a medium slope at time t1, and levels off in a saturation state from time t4. In the corresponding current curve (2) of FIG. 6B, the output current exponentially decreases with respect to time after a slightly reduced peak current of 9.58 mA is generated for a short time at time t1. The output current then stays in the ground state from time t4, and gradually decreases, so that no current flows.

In the voltage curve (3) of FIG. 6A, corresponding to the maximum turn-on time interval, the output voltage increases with respect to time proportionately to a gradual slope at time t1, and levels off in a saturation state from time t6. In the corresponding current curve (3) of FIG. 6B, the output current exponentially decreases with respect to time after a further reduced peak current of 8.75 mA is generated for a short time at time t5, then stays in the ground state from time t6, and gradually decreases so that no current flows.

Operation of the switched-capacitor DC-DC converter, according to an exemplary embodiment of the present invention, will be described with reference to FIGS. 4 to 6B.

First, the pulse-width control register 120 of the pulse-width controller 100 pre-stores clock pulse widths of the precharge clock pulse and the pump clock pulse for each time interval. The time control register 140 pre-stores a count time of duration of a clock pulse of each time interval.

In an embodiment, since a full pulse width may be used in the maximum turn-on time interval of the time intervals, the pulse width does not need to be specially controlled. Therefore, the pulse-width control register 120 may pre-store only clock pulse widths for the minimum turn-on time interval and the turn-on time control interval, and the time control register 140 may pre-store only count times of durations of clock pulses for the minimum turn-on time interval and the turn-on time control interval.

When the DC-DC converter is powered on and its operation is started, the pulse-width control register 120 outputs multiple pulse-width control signals P_con for controlling the stored clock pulse widths during the time intervals, and the time control register 140 outputs multiple count control signals C_con for controlling the stored count times of durations of the clock pulses during the time intervals.

In the pulse-width controller 100, the counter 160 outputs first and second count finish signals C_fin1 and C_fin2 based on the count control signals C_con received from the time control register 140 and the count times of the clock pulses in the time intervals.

In the clock pulse generator unit 200, the oscillator 220 generates a clock signal having a uniform cycle and duty ratio. The first to third pulse generators 242, 244 and 246 receive the clock signal from the oscillator 220 and generate precharge clock pulses Φ1 and pump clock pulses Φ2 in which pulse widths and durations are different in the various time intervals.

Since the second pulse generator 244 can control the turn-on times of the precharge clock pulse and the pump clock pulse in multiple time intervals, it can be configured with multiple pulse generators. For purposes of explanation, though, the following description assumes one pulse generator corresponding to one turn-on time control interval.

The first pulse generator 242 generates a precharge clock pulse Φ1 and a pump clock pulse Φ2 in which required turn-on times are short during the minimum turn-on time interval, beginning at the initial operation time. In the turn-on time control interval, which begins after the first time T1 of FIG. 5, the second pulse generator 244 receives a pulse-width control signal from the pulse-width control register 120 of the pulse-width controller 100 and generates a precharge clock pulse Φ1 and a pump clock pulse Φ2 in which the turn-on times are a predetermined time longer than the precharge clock pulse Φ1 and the pump clock pulse Φ2 occurring during the minimum turn-on time interval, respectively. In the maximum turn-on time interval, which begins after the second time T2 of FIG, the third pulse generator 246 generates a precharge clock pulse Φ1 and a pump clock pulse Φ2 in which the turn-on times are a predetermined time longer than the precharge clock pulse Φ1 and the pump clock pulse Φ2 occurring during the turn-on time control interval, respectively.

The multiplexer 260 of the clock pulse generator unit 200 initially selects and outputs the precharge clock pulse Φ1 and the pump clock pulse Φ2 generated by the first pulse generator 242 during the minimum turn-on time interval from the initial operation time to first time T1. In response to the first count finish signal C_fin1 from the counter 160 of the pulse-width controller 100, the precharge clock pulse Φ1 and the pump clock pulse Φ2 generated by the second pulse generator 244 are selected and output during the turn-on time control interval from first time T1 to second time T2. In response to the second count finish signal C_fin2, the precharge clock pulse Φ1 and the pump clock pulse Φ2 generated by the third pulse generator 246 are selected and output during the maximum turn-on time interval after second time T2.

More particularly, when the clock pulse generator unit 200 outputs the precharge clock pulse Φ1 and the pump clock pulse Φ2 during the minimum turn-on time interval at the initial operation time, the first switches S1-1 and S1-2 are turned on in response to the high-level precharge clock pulse Φ1. Then, nodes n1 and n2 are connected and precharged to the power supply voltage VDD, and node n3 is precharged to the ground voltage. Since the pump clock pulse Φ2 is in the high-level state while the precharge clock pulse Φ1 is maintained at the high level, the second switches S2-1 and S2-2 are still in the turn-off state.

Then, when the precharge clock pulse Φ1 transitions to the low level, the first switches S1-1 and S1-2 are turned off. In this state, when the pump clock pulse Φ2 transitions to the low level, the second switches S2-1 and S2-2 are turned on in response to the first low-level interval 1/4 of FIG. 5. Node n3 receives the power supply voltage VDD, and a charge pumping operation is performed by the capacitor cp1, such that node n2 is pumped to the voltage 2 VDD, e.g., according to the law of conservation of electric charge.

When the second switches S2-1 and S2-2 are turned on, nodes n2 and n4 are connected, and the pumped voltage 2 VDD is transferred from node n2 to node n4. Accordingly, high voltage VPP corresponding to the maximum voltage 2 VDD is generated and provided from a high-voltage generation terminal.

When the pump clock pulse Φ2 again transitions to the high level, the second switches S2-1 and S2-2 are again turned off. When the precharge clock pulse Φ1 again transitions to the high level after predetermined time 1t2 has elapsed, the first switches S1-1 and S1-2 are again turned on and the above-described operation is repeated.

However, since the output voltage indicated by curve (1) of FIG. 6A increases with respect to time proportionately with a steep slope at time t1 during the minimum turn-on time interval, the first and second pump capacitors cp1 and cp2, in states in which no electric charge is stored at the initial operation time, are pumped to the voltage 2 VDD when the first and second switches S1-1 S1-2 and S2-1, S2-2 are turned on for a short turn-on time. As shown in FIG. 6B, a large peak current of 23.08 mA, corresponding to the output current indicated by curve (1), is rapidly generated according to the relationship $i(t)=C \times d(2\,VDD)/dt$ at time t1.

However, when a count of 1000, for example, is counted to the first time T1 indicating the duration of clock pulses in the minimum turn-on time interval stored in the time control register 140, the counter 160 of the pulse-width controller 100 outputs the first count finish signal C_fin1. Upon receipt of the first count finish signal C_fin1 from the counter 160 of the pulse-width controller 100, the multiplexer 260 of the clock pulse generator unit 200 selects and outputs the precharge clock pulse Φ1 and the pump clock pulse Φ2 generated by the second pulse generator 244, stopping the selection of the precharge clock pulse Φ1 and the pump clock pulse Φ2 generated by the first pulse generator 242.

Accordingly, the turn-on time control interval starts from first time T1. When the clock pulse generator unit 200 outputs the precharge clock pulse Φ1 and the pump clock pulse Φ2 in which the turn-on times are predetermined times longer than those of the minimum turn-on time interval, the first switches S1-1 and S1-2 are turned on, nodes n1 and n2 are precharged to the power supply voltage VDD, and node n3 is precharged to the ground voltage. When the precharge clock pulse Φ1 transitions to the low level and the pump clock pulse Φ2 transitions to the low level, the second switches S2-1 and S2-2 are turned on, and node n3 has the power supply voltage VDD. The charge pumping operation is performed by the capacitor cp1, and node n2 is pumped to the voltage 2 VDD. When the second switches S2-1 and S2-2 are turned on, nodes n2 and n4 are connected, and the pumped voltage 2 VDD is transferred from the node n2 to node n4, thereby generating the high voltage VPP corresponding to the maximum voltage 2 VDD from the high-voltage generation terminal. Since this operation is the same as that of the minimum turn-on time interval, additional detailed description will not be repeated.

In the turn-on time control interval, which is different from the minimum turn-on time interval, as shown in FIGS. 6A and 6B, the output voltage indicated by curve (2) increases with respect to time proportionately to a medium slope at the time t1. When the turn-on times of the first and second switches S1-1, S1-2 and S2-1, S2-2 are relatively longer, the first and second pump capacitors cp1 and cp2 are pumped to the voltage 2 VDD. As shown in FIG. 6B, a middle-level peak current of 9.58 mA corresponding to the output current indicated by curve (2) is generated according to the relationship $i(t)=C \times d(2\,VDD)/dt$ at the time t1.

Then, when a count from the first time T1 is 1000, for example, indicating the duration of clock pulses in the turn-on time control interval (T1-T2), stored in the time control register 140, the counter 160 of the pulse-width controller 100 outputs the second count finish signal C_fin2. Upon receipt of the second count finish signal C_fin2 from the counter 160 of the pulse-width controller 100, the multiplexer 260 of the clock pulse generator unit 200 selects and outputs the precharge clock pulse Φ1 and the pump clock pulse Φ2 generated by the third pulse generator 246, stopping the selection of the precharge clock pulse Φ1 and the pump clock pulse Φ2 generated by the second pulse generator 244.

Accordingly, the maximum turn-on time interval starts from the second time T2. When the clock pulse generator unit 200 outputs the precharge clock pulse Φ1 and the pump clock pulse Φ2 in which the turn-on times are predetermined times longer than in the turn-on time control interval, respectively, the first switches S1-1 and S1-2 are turned on, nodes n1 and n2 are precharged to the power supply voltage VDD, and node n3 is precharged to the ground voltage. When the precharge clock pulse Φ1 transitions to the low level and the pump clock pulse Φ2 transitions to the low level, the second switches S2-1 and S2-2 are turned on and node n3 receives the power supply voltage VDD. The charge pumping operation is performed by the capacitor cp1, and the node n2 is pumped to the voltage 2 VDD. When the second switches S2-1 and S2-2 are turned on, the nodes n2 and n4 are connected, and the pumped voltage 2 VDD is transferred from the node n2 to the node n4, thereby generating the high voltage VPP corresponding to the maximum voltage 2 VDD from the high-voltage generation terminal. Since this operation is the same as in the minimum turn-on time interval and the turn-on time control interval, additional detailed description will not be repeated.

During the maximum turn-on time interval, which is different from the minimum turn-on time interval and the turn-on time control interval, as shown in FIGS. 6A and 6B, the output voltage indicated by curve (3) increases with respect to time proportionately to a gradual slope at the time t1. When the turn-on times of the first and second switches S1-1, S1-2 and S2-1, S2-2 are longest, the first and second pump capacitors cp1 and cp2 are pumped to the voltage 2 VDD. As shown in FIG. 6B, a reduced peak current of 8.75 mA corresponding to the output current indicated by curve (3) is generated according to the relationship $i(t)=C \times d(2\,VDD)/dt$ at the time t5.

According to exemplary embodiments of the present invention, the switched-capacitor DC-DC converter can control the amount of current flowing into pump capacitors by generating different clock pulses, in which pulse widths and durations differ according to time intervals through soft start control for shortening turn-on duty times of the clock pulses at an initial operation time and gradually lengthening the turn-on duty times with respect to lapse of time, in place of conventional ON-OFF control. Also, an increase in an inrush current can be distributed to the time intervals by reducing a slope of an output voltage variation, thereby preventing an inrush current from being rapidly output during a short turn-on time. Thus, the DC-DC converter can softly start an excessive inrush current at an initial operation time of a DC-DC converter and selectively control the inrush current and a slow start-up time which may additionally occur.

While the present invention has been shown and described in connection with exemplary embodiments thereof, it will be apparent to those skilled in the art that various modifications can be made without departing from the spirit and scope of the invention as defined by the appended claims.

What is claimed is:

1. A DC-DC converter comprising:
   a charge pump unit that precharges a boost node in response to a precharge clock pulse and boosts the boost node to a boosted voltage in response to a pump clock pulse;
   a clock pulse generator unit that generates the precharge clock pulse and the pump clock pulse in which corresponding pulse widths increase over time during a plurality of time intervals; and a pulse-width controller that outputs a plurality of pulse-width control signals for shortening turn-on times of the precharge clock pulse and the pump clock pulse at an initial operation time, and lengthening the turn-on times by the pulse widths for corresponding durations of the time intervals, after storing the pulse widths and corresponding durations according to the time intervals, wherein the charge pump unit comprises:

a plurality of first switches that precharge a first node and a second node to a first voltage by connecting the first and second nodes, and precharge a third node to a second voltage, in response to the precharge clock pulse;

a plurality of second switches that connect the first and third nodes, and that connect the second node to a fourth node, in response to the pump clock pulse in the charge pumping operation;

a first pump capacitor, connected between the first node and the third node, that performs a charge pumping operation for the first node and the second node precharged to the first voltage, in response to the pump clock pulse; and a second pump capacitor, connected between the fourth node and the second voltage, that outputs the boosted voltage by receiving a pumped voltage of the second node through the fourth node precharged to the second voltage when the plurality of second switches are turned on, and wherein the clock pulse generator unit comprises:

a plurality of pulse generators that generate and selectively output precharge clock pulses and pump clock pulses having pulse widths increasing according to the plurality of time intervals, in response to the plurality of pulse-width control signals, based on a clock signal.

2. The DC-DC converter of claim 1, wherein the pulse-width controller comprises:

a pulse-width control register that pre-stores the pulse widths of clock pulses according to the time intervals and outputs the plurality of pulse-width control signals for controlling the pulse widths stored according to the time intervals when an operation is started;

a time control register that pre-stores the clock pulses according to the time intervals and outputs a plurality of count control signals for controlling the durations of the time intervals stored for the clock pulses when the operation is started; and a counter that outputs a plurality of count finish signals by counting the clock pulses in the time intervals in response to the plurality of count control signals.

3. The DC-DC converter of claim 2, wherein the clock pulse generator further comprises:

an oscillator that generates the clock signal having a regular cycle and a regular duty ratio; and a multiplexer that receives the precharge clock pulses and the pump clock pulses from the plurality of pulse generators, and selects and outputs one precharge clock pulse and one pump clock pulse in response to each of the plurality of count finish signals.

4. The DC-DC converter of claim 3, wherein the plurality of pulse generators comprise:

a first pulse generator that receives the clock signal and generates the precharge clock pulse and the pump clock pulse, respectively having short turn-on times, in a first time interval in response to one of the plurality of pulse-width control signals;

a second pulse generator that receives the clock signal and generates the precharge clock pulse and the pump clock pulse, respectively having turn-on times longer by predetermined amounts than the turn-on times of the first time interval, in a second time interval in response to another one of the plurality of pulse-width control signals, the second time interval starting after a first time has elapsed during the first time interval; and a third pulse generator that receives the clock signal and generates the precharge clock pulse and the pump clock pulse, respectively having turn-on times longer by predetermined amounts than the turn-on times of the second time interval, in a third time interval in response to another one of the plurality of pulse-width control signals, the third time interval starting after a second time has elapsed during the second time interval.

5. The DC-DC converter of claim 4, wherein the second pulse generator comprises:

a plurality of pulse generators that control the turn-on times of the precharge clock pulse and the pump clock pulse in a plurality of second time intervals.

6. The DC-DC converter of claim 4, wherein the multiplexer selects and outputs the precharge clock pulse and the pump clock pulse generated by the first pulse generator in the first time interval, selects and outputs the precharge clock pulse and the pump clock pulse generated by the second pulse generator in response to one of the plurality of count finish signals in the second time interval, and selects and outputs the precharge clock pulse and the pump clock pulse generated by the third pulse generator in response to another one of the plurality of count finish signals in the third time interval.

7. The DC-DC converter of claim 6, wherein the precharge clock pulse comprises a high-level duration shorter than a low-level duration, and the pump clock pulse comprises a high-level duration is longer than a low-level duration.

8. The DC-DC converter of claim 7, wherein the precharge clock pulse performs a turn-on operation in the high-level duration and a turn-off operation in the low-level duration, and the pump clock pulse performs a turn-off operation in the high-level duration and a turn-on operation in the low-level duration.

9. The DC-DC converter of claim 8, wherein the first node comprises a power supply voltage node, the second node comprises the boost node, the third node comprises a ground voltage node, and the fourth node comprises an output voltage node.

10. The DC-DC converter of claim 9, wherein the first voltage is a power supply voltage and the second voltage is a ground voltage.

11. The DC-DC converter of claim 10, wherein the first time interval is a minimum turn-on time interval from the initial operation time to the first time, the second time interval is a turn-on time control interval from the first time to the second time, and the third time interval is a maximum turn-on time interval after the second time.

12. The DC-DC converter of claim 11, wherein the second time interval comprises a plurality of second time intervals, during which the turn-on times of the precharge clock pulse and the pump clock pulse are controlled.

* * * * *